Jan. 1, 1924.

J. SLEPIAN 1,479,159

DYNAMO ELECTRIC SYSTEM

Filed Aug. 15, 1919

2 Sheets-Sheet 1

WITNESSES:
H.J. Shelhamer
a.a.brand

INVENTOR
Joseph Slepian
BY
Wesley G. Carr
ATTORNEY

Jan. 1, 1924. 1,479,159
J. SLEPIAN
DYNAMO ELECTRIC SYSTEM
Filed Aug. 15, 1919 2 Sheets-Sheet 2

WITNESSES:
H. T. Shelhamer
A. A. Brand

INVENTOR
Joseph Slepian
BY
Wesley G. Carr
ATTORNEY

Patented Jan. 1, 1924.

1,479,159

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

DYNAMO-ELECTRIC SYSTEM.

Application filed August 15, 1919. Serial No. 317,689.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Dynamo-Electric Systems, of which the following is a specification.

My invention relates to dynamo-electric systems wherein a commutator is employed, and it has for its object to provide apparatus whereby the torque function may be developed at a point other than that where the commutating or electrical converting function is performed.

Figure 1:
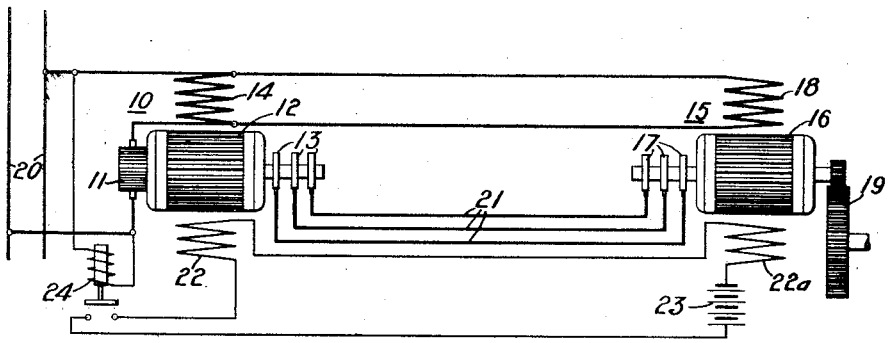
Figure 2:
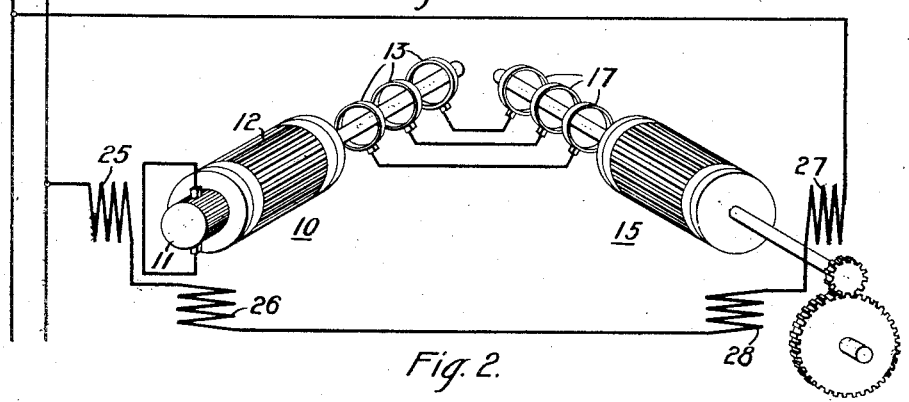
Figure 3:
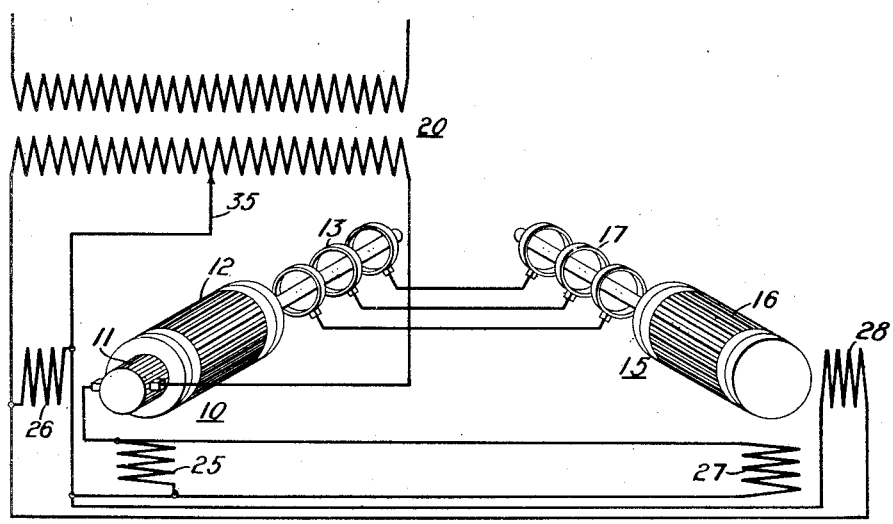
Figure 4:
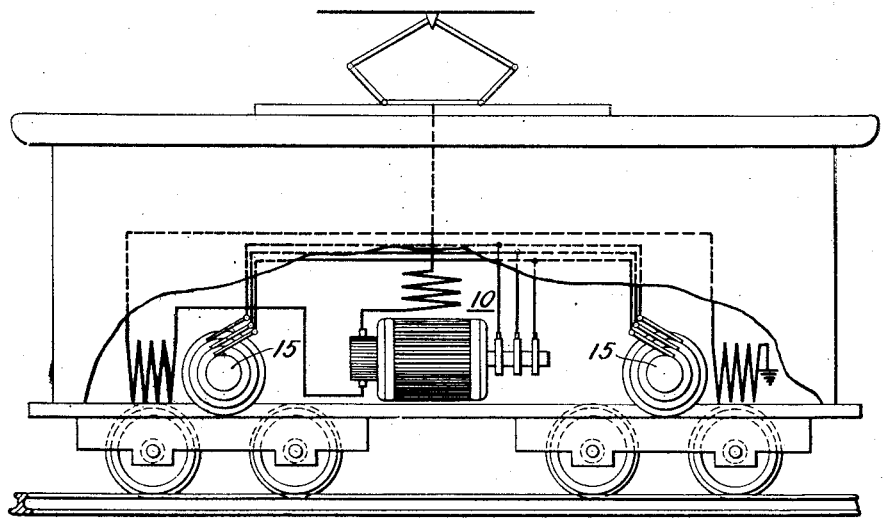

In the accompanying drawing, Fig. 1 is a diagrammatic view of a dynamo-electric aggregate having the operating characteristics of a series-type commutator machine; Figs. 2 and 3 are views, similar to Fig. 1, and corresponding, respectively, to an Atkinson motor, and to a doubly-fed motor; and Fig. 4 is a side view of a locomotive, partially in section and partially in elevation, illustrating one application of my invention.

In the ordinary dynamo-electric machine of the commutator type, the commutator is attached to the armature, or member which is the seat of the torque-electromotive-force transformation in the machine, the sequence or direction of said transformation depending on whether a motor or generator action is desired. The commutator is thus subjected to the same conditions of speed, moisture, dirt, etc., as the armature itself.

It frequently happens that commutation could be effected in a more satisfactory manner if the commutator were driven at a speed different from that of the armature with which it functions and, furthermore, it frequently occurs that space is limited where it is desired that the armature shall operate.

With the above and other objects in view, I find that the function of a dynamo-electric machine of the commutator type may be satisfactorily performed by the joint use of two distinct machines, one of which performs primarily the commutating function and the other of which performs the torque-electromotive-force transformation. Under these conditions, the machines may operate at different speeds, if desirable, appropriate change in the pole number being made, and furthermore, the commutating function may be performed in a clean, dry location where it is necessary that the armature shall operate under conditions of dirt and moisture.

Not only this, but where, as in railway locomotives, the overall length of the armature is determined by fixed considerations, such as the track gauge, the removal of the commutating function to the cab permits the mounting of more active iron in the truck and, consequently, permits the production of more power per axle in a given locomotive than would otherwise be possible.

Referring to the drawing for a more detailed understanding of my invention, I show the operating equivalent of a series-type commutator motor in Fig. 1. A dynamo-electric machine, which I shall hereinafter refer to as the commutator member of my machine aggregate, is shown at 10 and comprises a commutator cylinder 11, an armature 12, slip rings 13, and a main field winding 14. The armature 12 is provided with an ordinary winding, as of the drum type, this winding being connected to the segments of the commutator 11 and the slip rings 13.

Electrically associated with the commutator member 10, is a second alternating-current machine 15 provided with a rotating armature member 16, slip rings 17 and a main field winding 18. The machine 15, or, as I will hereinafter designate it, the torque member of the machine aggregate, is provided with gearing 19 whereby a mechanical load may be driven therefrom.

Energy for the operation of the system just described is derived from a source of alternating-current power indicated by suitable mains 20. The energy transfer from the commutator member 10 to the torque member 15 is effected through leads 21 which connect the slip rings 13 to the slip rings 17.

It will be noted that I have illustrated the member 10 as of substantially the same size as the member 15 but it should be understood that this illustration is merely diagrammatic and is not indicative of the actual sizes of the machines employed, inasmuch as the commutator member 10 has a relatively small armature member 12 because it is necessary that this machine develop only sufficient driving torque to care for the friction, windage, and other losses. Moreover, as hereinafter more fully explained in connection with the operation of my system, there is very close cancellation between the incoming and outgoing currents in the armature member 12, and, therefore, a relatively small amount of copper will suffice for a large quantity of power. The result is that the member 10 is decidedly smaller than the member 15, and it may be said, therefore, that the member 10 is devoted primarily to the commutating function of the machine aggregate.

In Fig. 1, I have shown the two main field windings 14 and 18 as connected in parallel relationship and find that, in some circumstances, this connection is productive of better results than a series connection of the fields in question. However, I wish it to be understood that I am in no way limiting my invention to the parallel connection of the main field windings of the commutating and torque members and, therefore, in the other illustrations of my device, I have illustrated both the series and parallel connection of the main-field windings.

As will hereinafter be pointed out in connection with the operation of my system, it is necessary that the commutator member and the torque member operate synchronously, or, as is commonly expressed, "in step". Since I find that one of the most advantageous applications of my system is in electrical railway locomotives, I further provide means whereby this synchronous operation of the two members is insured, even though there is a temporary cessation in the power supplied to the system, such as is occasioned, for instance, by the jumping of the trolley, or by momentary short circuits on the distributing system. Such means comprise auxiliary series-connected field windings 22 and 22a, functioning with the member 10 and the member 15, respectively. The auxiliary field windings 22 and 22a are energized from any suitable source of direct-current energy, such, for instance, as a battery 23, through the intermediary of a relay-operated switch 24.

Having thus described the arrangement of a system embodying my invention, the operation thereof is as follows. Energy for the operation of the machine aggregate is supplied from the alternating-current mains 20 through the commutator 11 to the member 10. The member 10 functions to convert the single-phase current of the supply frequency to unbalanced polyphase currents of a frequency corresponding to the speed of the armature 12. The polyphase currents flow out through the slip rings 13 and into the machine member 15, through the slip rings 17, producing in the armature 16 an alternating field similar to the field in the member 10 but rotating at a speed corresponding to the speed of the armature 12. It will be observed, therefore, that, although the members 10 and 15 may be disposed at widely separated points, in so far as the armature currents are concerned, the two members operate as one element, comprising an armature and a commutator member rigidly connected and rotating together. Moreover, the unbalanced polyphase currents drawn from the armature 12 are such as to substantially neutralize the single-phase input currents in a manner well understood in connection with rotary converters.

Referring now to the energization of the main field windings, it will be observed, that I have insured the existence of analogous load characteristics and distribution in the main-field windings 14 and 18 by the parallel connection thereof with the source of supply. Such connection insures the maintenance of equal voltages across the two fields and, therefore, assuming that the field windings are designed with a proper consideration of the varying sizes which the two machine elements may take, similar load conditions obtain therein. However, since the main field 14 is primarily excited in series relationship with the brushes bearing upon the commutator 11 and from the source of alternating-current energy 20, the aggregate operates, as a whole, in exactly the same manner as a series-excited alternating-current commutator motor.

It may be pointed out that, with the series connection of the main field windings of the two elements, the fields in the two machines are necessarily the same, because of the low-resistance armature windings, and, therefore, the connection of the two armatures through the slip rings allows currents to circulate in the armature circuits which react in such manner as to compel the field currents to be the same. I find that, by properly mutually proportioning the armature windings of the two machines, the circulating currents or the uncancelled components of the currents are reduced to a very low value.

Some further marked advantages of the present system may be emphasized. First of all, the armature 16 and the field winding 18 of the element 15 are both conductively energized so that the power factor of the latter element is usually maintained at a somewhat higher value than would be possible with an induction machine wherein one member is energized inductively from the other member. This feature permits the use of a far larger air gap than would be possible if the motor were of the large induction type, a good power factor being maintained at the same time. This consideration is of importance under the operating conditions to which railway propulsion motors are subjected, the mechanical clearances of such motors being necessarily large.

Furthermore, the system as described is peculiarly applicable to electric-railway-propulsion work because of the desirable speed-torque characteristics.

In order to further illustrate the flexibility of my invention, when applied to electric locomotives, I have illustrated, in Fig. 4, my improved system as applied to a locomotive of that type, and, since the main field windings may be either parallel or series-connected, I have, in this figure, illustrated the field windings as connected in series relationship. It will be observed that, by proper proportioning, the commutator member 10 may function as the seat of the current commutation for both sets of torque elements, one of the latter being applied to each truck of the locomotive. The commutating element 10 is preferably placed in the cab, and the dead weight upon the truck is thereby lessened. Moreover, the commutating function is performed in a distinctly more satisfactory manner, due to the removal of the commutator from the crowded, illy-ventilated and dirty location on the trucks to the clean and dry location within the cab. The positioning of the commutator element within the cab admits also of careful inspection and adjustment by the operator of the locomotive. Furthermore, the amount of available iron, per truck, may may be increased, since no axial space is now occupied by the commutator with a resulting increase in the maximum torque developed.

Referring to the form of my invention shown in Fig. 2, I show a system having the operating characteristics of a repulsion motor of the two-field type, or what is more ordinarily called, the Atkinson motor. A commutating dynamo-electric machine 10 comprises the armature 12 having the commutator 11 thereupon and mounted to rotate in the field produced by an exciting field winding 25 and an inducing field winding 26. The commutator 11 is short-circuited by brushes in electrical alinement with the inducing winding, as is usual in Atkinson motors. Energy from the slip rings 13 of the machine 10 is supplied to a machine 15 similar to the corresponding machine in the system of Fig. 1 except that it has quadrature-related field windings 27 and 28. The operating characteristics of the system of Fig. 2 with alternating currents and under both motoring and generating conditions will be readily apparent from a discussion of Fig. 1, attention being directed to the fact that the operating characteristics of the Atkinson motor are secured by reason of the fact that the fluxes in the member 10 are reproduced in the machine 15 but rotated at a speed corresponding to the speed of the machine 10. It will be noted that the field windings of the commutating and torque elements are connected in series relationship.

In the system of Fig. 3, which is the operative equivalent of the ordinary double-fed commutating machine, the commutating aggregate 10 comprises a commutator 11, an armature 12 and slip rings 13, as before, and further comprises an exciting field winding 25 and an inducing field winding 26. A commutator 11 embodies brushes in electrical alinement with the inducing field winding, and the exciting field winding 25 is connected across a portion of the source 20 through the brushes of the commutator 11 and an intermediate adjustable tap 35. The inducing field winding 26 is connected between the intermediate tap 35 and the other terminal of the source 20. The operating machine 15 comprises an armature 16 and slip rings 17, as before, and quadrature-related field windings 27 and 28, the field winding 27 being connected in parallel relation with the field winding 25 and the field winding 28 being connected in a similar relation with the field winding 26. The operating characteristics of the aggregate thus described will be obvious from a consideration of the foregoing discussion and from the knowledge of the operating characteristics of the ordinary doubly-fed motor, both when used in motoring or in recuperation.

In all of the foregoing descriptions of the various embodiments of my invention, the operation thereof under motoring conditions has been stressed, but I wish it understood that the same advantages and benefits ensue when the system is used for regeneration.

While I have shown my invention as applied to a plurality of different forms of dynamo-electric machine aggregates, it will be obvious to those skilled in the art that it is not so limited, and I desire, therefore, to broadly claim the separation of the commutating and torque functions in an alternating-current commutator machine, and further desire that only such limitations shall be placed upon the hereinbefore described invention as are imposed by the prior art or are specifically set forth in the appended claims.

I claim as my invention:

1. The combination with a series-type single-phase commutator machine, of polyphase current-distributing members connected to the armature winding of said machine, a second machine having a polyphase member and a relatively rotatable single-phase member, and connections between said polyphase member and said polyphase current distributing members.

2. In a dynamo-electric system, the combination with a source of alternating current, of a commutator machine provided with a main series-excited field winding, an alternating-current machine having a main field winding, connecting means for insuring the synchronous operation of said machines, and means for further holding said machines in step although there is a momentary tendency for them to depart therefrom.

3. In a dynamo-electric system, the combination with a source of alternating current, of a commutator machine provided with a main series-excited field winding, an alternating-current machine having a main field winding, connecting means for insuring the synchronous operation of said machines, auxiliary direct-current-excited field windings on each of said machines, and means for energizing said auxiliary field windings when the main source of supply fails.

4. In a dynamo-electric system, the combination with a source of alternating current, of a commutator machine provided with a main series-excited field winding, an alternating-current machine having a main field winding, connecting means for insuring the synchronous operation of said machines, auxiliary direct-current-excited field windings on each of said machines, means for energizing said auxiliary windings, and a relay-operated switch for closing said auxiliary field-winding circuits when the main source of power fails.

5. The combination with a single-phase line, of a dynamo-electric machine having a relatively stationary winding and a relatively rotatable polyphase winding, an auxiliary dynamo-electric machine having a relatively stationary winding and a relatively rotatable armature winding, a commutator cylinder and terminal connections connected to said armature winding, brushes for said commutator cylinder, a system of conductors connected to said brushes, another system of conductors connected to said terminal connections, one of said systems being single-phase and the other polyphase, means for connecting said single-phase system to said single-phase line, means for connecting said polyphase system to said polyphase winding, and means for supplying a unidirectional magnetizing current to the relatively stationary windings of the two machines.

In testimony whereof, I have hereunto subscribed my name this 30th day of July, 1919.

JOSEPH SLEPIAN.